United States Patent
Nakata

(10) Patent No.: US 7,931,346 B2
(45) Date of Patent: Apr. 26, 2011

(54) ELECTRONIC APPARATUS FOR SUPPRESSING HEAT GENERATION FROM PLURALITY OF MOTORS

(75) Inventor: Kenichiroh Nakata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 190 days.

(21) Appl. No.: 12/301,206

(22) PCT Filed: May 1, 2007

(86) PCT No.: PCT/JP2007/059333
§ 371 (c)(1),
(2), (4) Date: Nov. 17, 2008

(87) PCT Pub. No.: WO2007/135846
PCT Pub. Date: Nov. 29, 2007

(65) Prior Publication Data
US 2009/0160884 A1    Jun. 25, 2009

(30) Foreign Application Priority Data

May 19, 2006   (JP) .................................. 2006-140876

(51) Int. Cl.
*B41J 29/38*   (2006.01)
*G05D 23/00*   (2006.01)
(52) U.S. Cl. ......................................... 347/14; 318/471
(58) Field of Classification Search ................... 347/14, 347/5
See application file for complete search history.

(56) References Cited

U.S. PATENT DOCUMENTS

2007/0003271 A1    1/2007   Ohsuga
2007/0116485 A1 *  5/2007   Nishida .......................... 399/69

FOREIGN PATENT DOCUMENTS

| DE | 3234673 A1 * | 3/1984 |
| JP | 1-150498 U | 10/1989 |
| JP | 03095362 A * | 4/1991 |
| JP | 05227344 A * | 9/1993 |
| JP | 2004-77895 A | 3/2004 |
| JP | 2005-77698 A | 3/2005 |
| JP | 2005-287253 A | 10/2005 |

* cited by examiner

*Primary Examiner* — Matthew Luu
*Assistant Examiner* — Shelby Fidler
(74) *Attorney, Agent, or Firm* — Birch, Stewart, Kolasch & Birch, LLP

(57) ABSTRACT

An electronic apparatus suppresses heat generation from a plurality of motors and a control circuit for controlling the motors without stopping operation of the motors entirely. When copy operation starts, an internal temperature of a facsimile apparatus 1 is detected. If the detected temperature is lower than a threshold value 1, an MPU section 10 instructs a motor control section 33 to operate a scanner motor 23, a CR motor 34, and a PF motor 35 at the same time. If the detected temperature is not lower than the threshold value 1 and is lower than a threshold value 2, the MPU section 10 instructs the control section 22 to operate the motors in a time-sharing mode, such that the scanner motor 23 and the CR motor 34, or alternatively, the scanner motor 23 and the PF motor 35, simultaneously operate in combination.

5 Claims, 6 Drawing Sheets

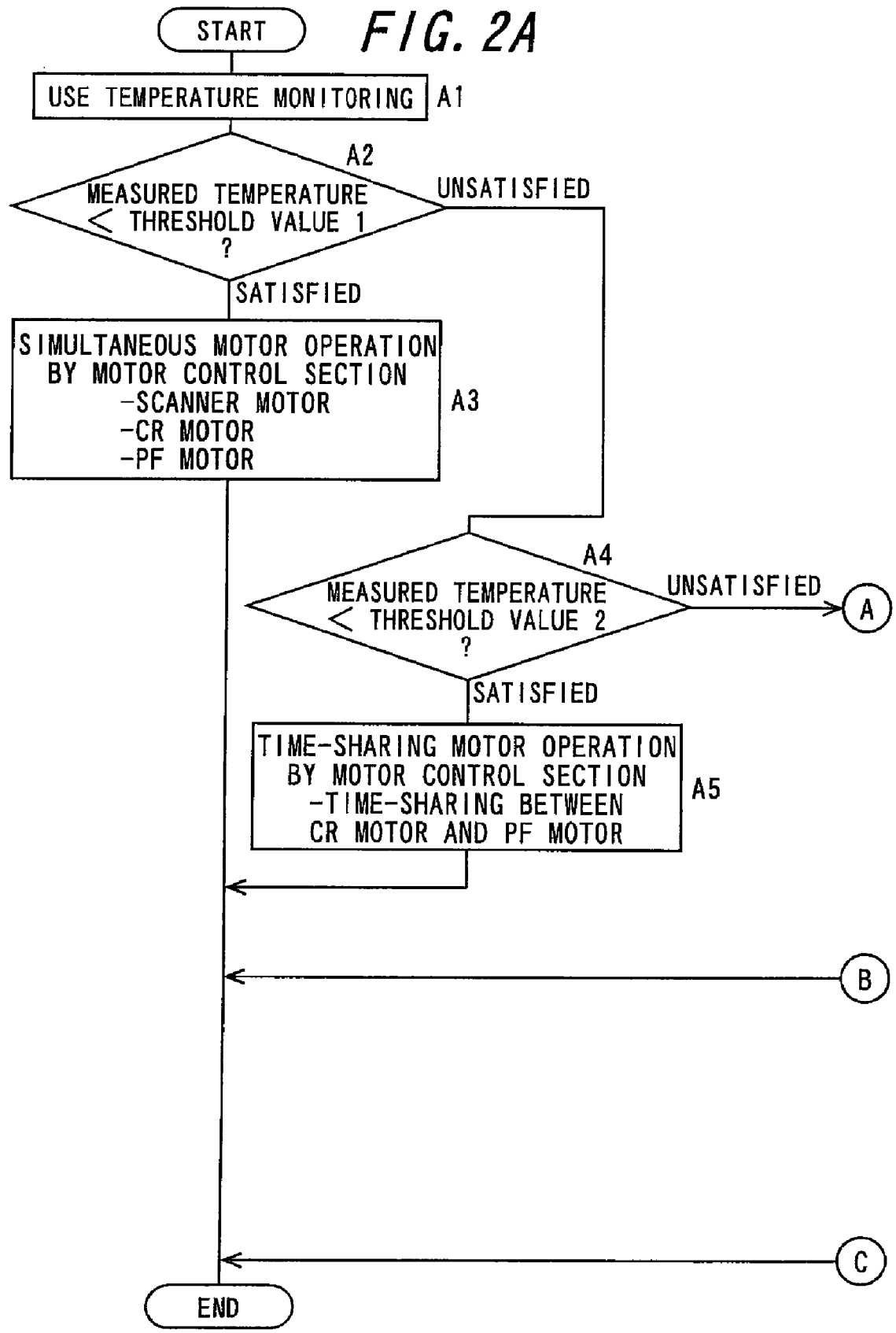

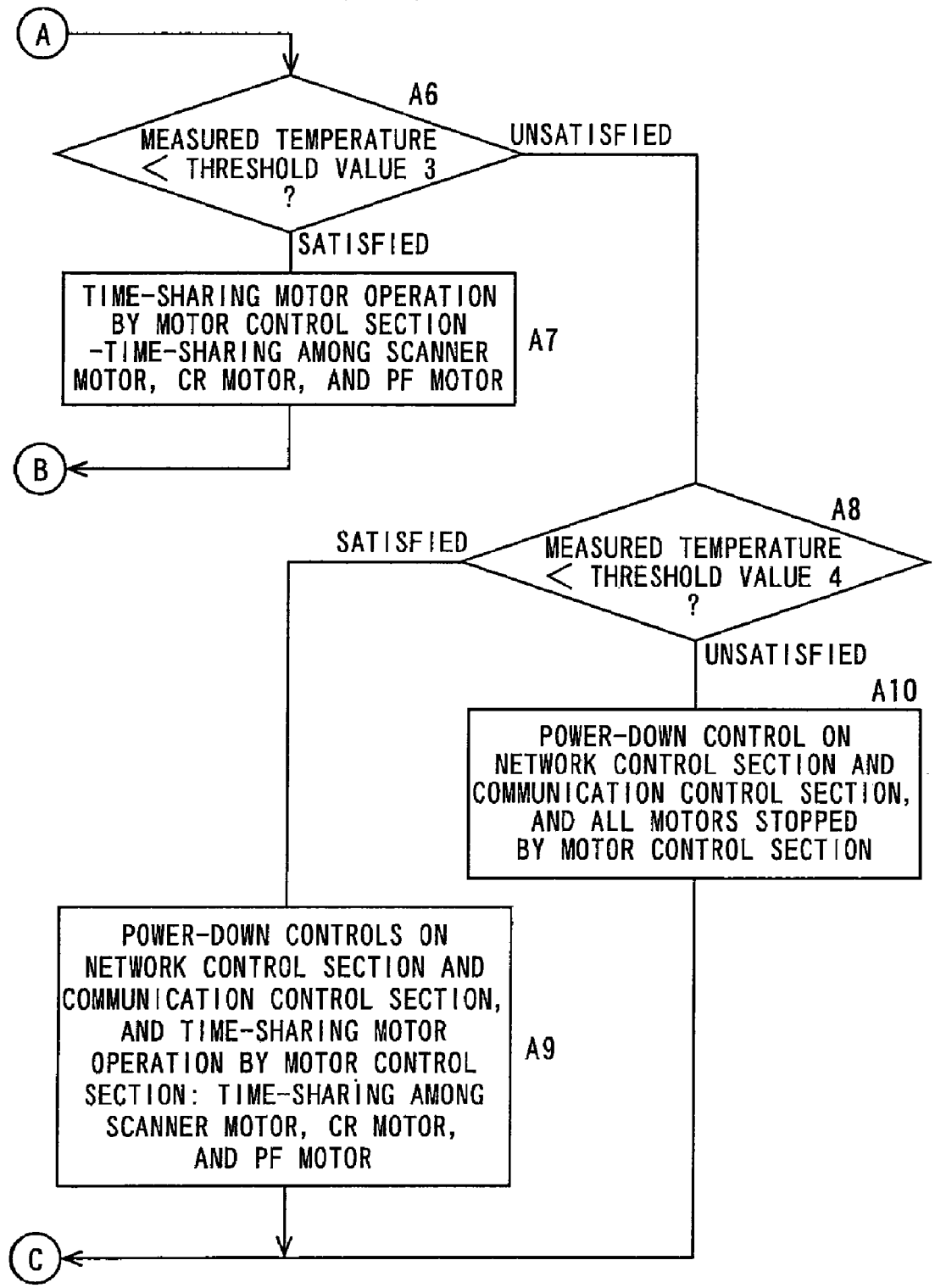

ELECTRONIC APPARATUS FOR SUPPRESSING HEAT GENERATION FROM PLURALITY OF MOTORS

BACKGROUND OF THE INVENTION

1. Field of the Invention

The invention relates to an electronic apparatus using a motor, and more specifically relates to an electronic apparatus in which a motor and electronic components such as an LSI controlling a motor are controlled so as not to be overheated.

2. Description of the Related Art

In many of the electronic apparatuses having drive parts, motors are mounted as driving sources for driving the drive parts. Continuous operation of the motor makes the motor itself generate heat by which the motor may have a temperature beyond such a predetermined upper limit that the motor will be broken.

As related art, there has been an electronic apparatus in which a motor temperature is controlled so as not to exceed its upper limit. In the electronic apparatus, a use environment temperature is detected by environment temperature detecting means while a calorific value of a motor is estimated based on power consumption of the motor, and on the basis of the use environment temperature detected by the environment temperature detecting means and the estimated calorific value, the motor is controlled by setting a downtime so that the temperature of the motor does not exceed the predetermined upper limit (for example, refer to Japanese Unexamined Patent Publication JP-A 2005-287253).

However, the related art has a problem that since the downtime is provided to prevent the temperature of the motor from exceeding the predetermined upper limit, it looks to a user as if the operation of the apparatus is temporarily suspended.

Furthermore, owing to recent development of LSI (large scale integration) technique, there exists a device so integrated that a plurality of motors used in the electronic apparatus are all controlled by one LSI chip. For example, the apparatus is created by integrating drivers for driving a carriage motor, a paper feed motor, and moreover, a low current stepper motor for scanner which is used in a facsimile apparatus, etc. It becomes a major issue how heat generation from not only the motors but also such an apparatus can be suppressed to control the apparatus under its upper limit use temperature.

SUMMARY OF THE INVENTION

An object of the invention is to provide an electronic apparatus in which heat generation from a plurality of motors and a control circuit for controlling the motors can be suppressed without stopping operation of the motors entirely.

The invention provides an electronic apparatus including:
a plurality of driving sources;
control means for controlling the plurality of driving sources; and
temperature detecting means for detecting an internal temperature of the apparatus incorporating the plurality of driving sources and the control means, wherein, when the temperature detected by the temperature detecting means is lower than a predetermined temperature, the control means operates all the plurality of driving sources simultaneously, and when the temperature detected by the temperature detecting means is equal to or higher than the predetermined temperature, the control means divides the plurality of driving sources into a first group composed of the driving sources to be operated and a second group composed of the driving sources to be stopped, and for every time point that a predetermined length of time has passed, the control means stops operation of at least one driving source out of the driving sources included in the first group and adding the driving source to the second group while operating at least one driving source out of the driving sources included in the second group and adding the driving source to the first group.

According to the invention, a plurality of driving sources is controlled by control means, and an internal temperature of an apparatus incorporating the plurality of driving sources and the control means is detected by temperature detecting means. Furthermore, when the temperature detected by the temperature detecting means is lower than a predetermined temperature, all the plurality of driving sources operate at the same time, and when the temperature detected by the temperature detecting means is equal to or higher than the predetermined temperature, the plurality of driving sources is divided into the first group composed of the driving sources to be operated and the second group composed of the driving sources to be stopped, and for every time point that a predetermined length of time has passed, operation of at least one driving source out of the driving sources included in the first group is stopped and added to the second group while at least one driving source out of the driving sources included in the second group operates and is added to the first group, whereby a part of the diving sources, i.e., motors, are stopped and the stopped motors are sequentially switched when the temperature detected by the temperature detecting means is equal to or higher than the predetermined temperature, with the result that heat generation from the plurality of motors and a control circuit for controlling the motors can be suppressed without stopping operation of the motors entirely. Consequently, the motors and electronic components such as LSI which controls the motors can be prevented from being broken, so that the reliability of the electronic apparatuses can be enhanced.

Further, in the invention, it is preferable that the predetermined temperature includes a plurality of predetermined different temperatures, and
the control means increases the number of driving sources included in the second group when a temperature higher than the highest predetermined temperature out of the plurality of predetermined temperatures is detected by the temperature detecting means.

According to the invention, the number of driving sources, i.e., motors, to be stopped is increased for every time that a higher predetermined temperature is detected out of the plurality of predetermined temperatures, therefore allowing for a further decrease in the calorific value. Consequently, the temperature can be quickly lowered.

Further, in the invention, it is preferable that the electronic apparatus comprises an additional circuit operating independently of operation of the plurality of driving sources and having a low-power-consumption mode that the additional circuit stands by on electric power less than electric power consumed in operation, wherein, the control means switches to the low-power-consumption mode the additional circuit irrelevant to operation to be done by the apparatus at that moment, when a temperature higher than the highest predetermined temperature out of the plurality of predetermined temperatures is detected by the temperature detecting means in a state of having one driving source in the first group.

According to the invention, the control means switches to the lower-power-consumption mode the additional circuit irrelevant to the operation to be done by the apparatus at that moment, when a temperature higher than the highest predetermined temperature out of the plurality of predetermined temperatures is detected by the temperature detecting means in a state of having one driving source in the first group, therefore leading to a decrease in a calorific value of the additional circuit, which thus allows the apparatus to have a lower temperature. Consequently, the apparatus can operate without stopping the operation of the electronic apparatus entirely.

Further, in the invention, it is preferable that the control means includes one LSI controlling the plurality of driving sources.

According to the invention, the control means includes one LSI controlling the plurality of driving sources, i.e., motors, with the result that the larger the number of the motors to be stopped is, the lower the temperature of the LSI can be. It is therefore possible to curb a rise of internal temperature of electronic apparatus with heat generated by the LSI.

Further, in the invention, it is preferable that the plurality of driving sources includes a carriage moving an ink head, a feed motor supplying and feeding recording paper for print use, and a scanner motor driving a scanner.

According to the invention, the plurality of driving sources, i.e., motors, includes a carriage motor moving an ink head, a feed motor supplying and feeding recording paper for print use, and a scanner motor driving a scanner, which motors are therefore applicable to a multifunctional machine having a plurality of functions such as a facsimile function. It is therefore possible to curb a rise of internal temperature of an apparatus represented by the multifunctional machine.

Further, in the invention, it is preferable that the predetermined length of time is a length of time for handling one sheet of the recording paper, or a length of time for handing one carriage, or combination of the length of time for handling one sheet of the recording paper and the length of time for handling one carriage.

According to the invention, the predetermined length of time is a length of time for handling one sheet of the recording paper, or a length of time for handing one carriage, or combination of the length of time for handling one sheet of the recording paper and the length of time for handling one carriage, with the result that the length of operation time can be set according to a role of the motor to be operated. It is therefore possible to efficiently operate an apparatus while its temperature rise is curbed.

BRIEF DESCRIPTION OF DRAWINGS

Objects, features, and advantages of the invention will be more explicit from the following detailed description taken with reference to the drawing wherein;

FIGS. 2A and 2B are flowcharts each showing a motor control process performed by the facsimile apparatus 1 shown in FIG. 1;

DETAILED DESCRIPTION OF THE INVENTION

Figure 1:
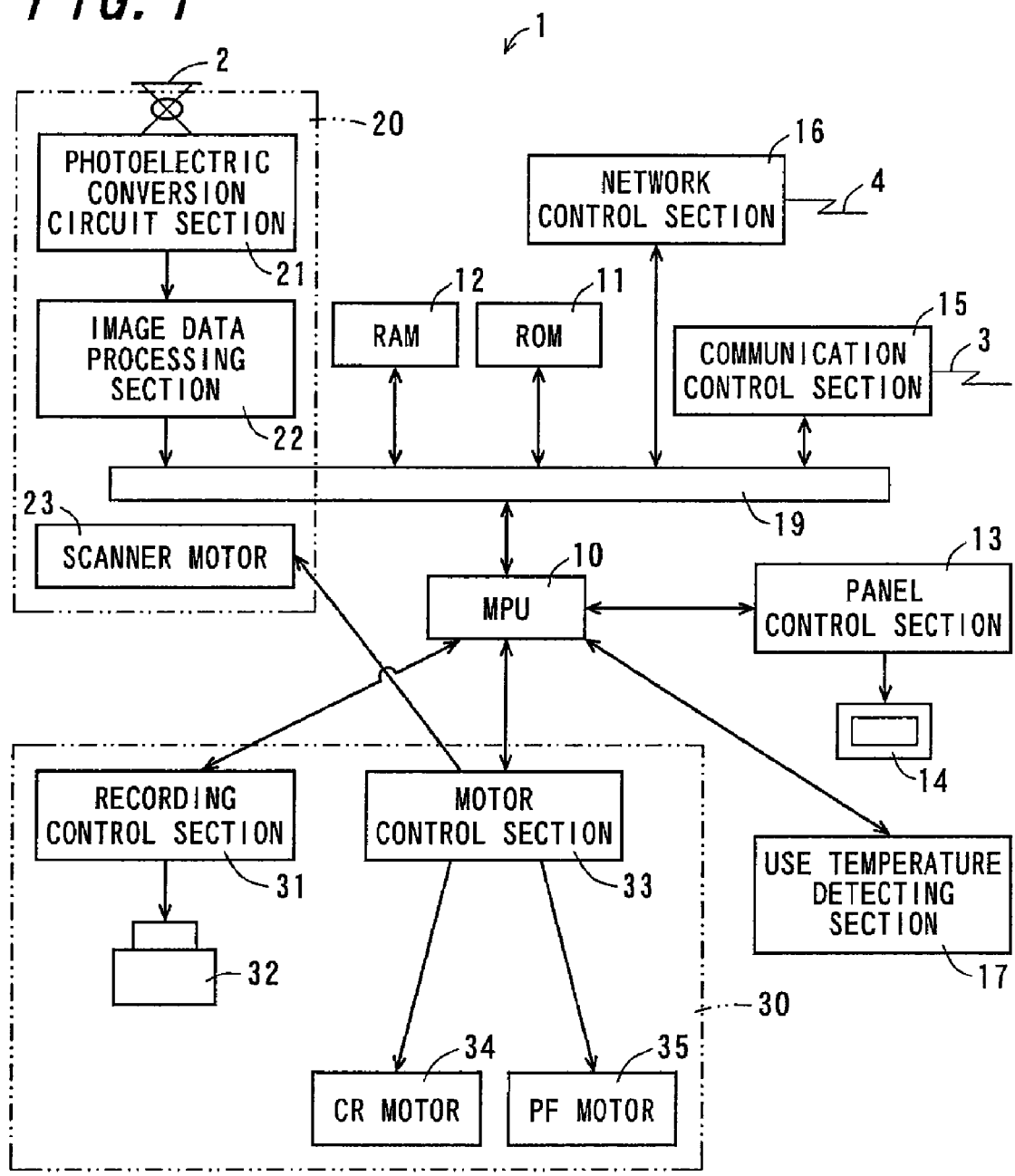
FIG. 1 is a block diagram showing a schematic structure of a facsimile apparatus 1 according to one embodiment of the invention.

Now referring to the drawings, embodiments of the invention are described below.

FIG. 1 is a block diagram showing a schematic structure of a facsimile apparatus 1 according to one embodiment of the invention. The facsimile apparatus 1 which is an electronic apparatus, is an ink-jet FAX (facsimile) machine, for example, and includes an MPU (micro processing unit) section 10, a ROM (read only memory) 11, a RAM (random access memory) 12, a panel control section 13, a display section 14, a communication control section 15, a network control section 16, a use temperature detecting section 17, a data bus 19, a reading operation unit 20, and a recording operation unit 30.

The MPU section 10 performs arithmetic processing for executing a control program for controlling the facsimile apparatus 1 and the other arithmetic processing required, and controls the panel control section 13, the communication control section 15, the network control section 16, the use temperature detecting section 11, the data bus 19, the reading operation unit 20, and the recording operation unit 30. The ROM 11 is constructed of a semiconductor memory, for example, and stores a control program, that is, firmware and control data necessary for control. The RAM 12 is constructed of, for example, a semiconductor memory, and is used as a work area for the MPU section 10 to perform the arithmetic processing as well as a temporary storage region for data including the control data.

The panel control section 13 controls a display and operation panel for the display section 14 including a display apparatus such as LCD (liquid crystal display) and an input apparatus such as an operation panel. The communication control section 15 is connected to a line 3 for call and communication, and thus transmits and receives a call or performs transmission and reception processing of facsimile protocol signals. The network control section 16 is connected to a network 4 for LAN (local area network) communication, and thus controls the communication over the network 4.

The use temperature detecting section 17 functions as temperature detecting means and is constructed of, for example, a thermistor, which section detects use temperatures around the motors, LSI (large scale integration), and electronic components incorporated in the facsimile apparatus 1. The temperatures detected by the use temperature detecting section 11 are notified to the MPU section 10. The data bus 19 is data bus used for data transmission among the MPU section 10, the ROM 11, the RAM 12, the communication control section 15, the network control section 16, and the reading operation unit 20.

The reading operation unit 20 is, for example, a scanner reading a document 2, and includes a photoelectric conversion circuit section 21, an image data processing section 22, and a scanner motor 23. The photoelectric conversion circuit section 21 optically scans the document 2 and sends the read data to the image data processing section 22 as image analog data. The image data processing section 22 digitalizes the image analog data received from the photoelectric conversion circuit section 21, and manipulates an image of digital data thus digitalized. The data thus manipulated Is sent to a recording control section 31 via the MPU section 10 and outputted by a print section 32 to the recording paper. The scan motor 23 is a motor serving as a driving source which moves the document 2 and thereby causes the photoelectric conversion circuit section 21 to scan the document at predetermined rate, and is controlled by a motor control section 33.

The recording operation unit 30 is, for example, a printer for outputting data on the recording paper, and includes the recording control section 31, the print section 32, the motor control section 33, a CR (carriage) motor 34, and a PF (paper feed) motor 35. The recording control section 31 converts the data received from the image data processing section 22 via the MPU section 10 into the data to be outputted to the recording paper, and causes the print section 32 to output the data to the recording paper. The print section 32 includes a cartridge from which the ink is sprayed to the recording paper, and the cartridge is driven by the CR motor 34 and thereby moves relatively to the recording paper. The motor control section 33 controls the scanner motor 23, the CR motor 34, and the PF motor 35 according to instructions of the MPU section 10. The CR motor 34 is a driving source which moves the cartridge at predetermined rate in order to perform printing. The PF motor 35 is a driving source which feeds and supplies the recording paper and then moves the recording paper at predetermined rate.

When a user selects, for example, copy operation by use of the panel control section 13, the MPU section 10 reads out firmware for copy from the ROM 11 and thereby controls the copy operation. The MPU section 10 causes the motor control section 33 to operate the scanner motor 23 while optically scanning the document 2 and thereby reading out its data, and causes the photoelectric conversion circuit section 21 to send the analog data to the image data processing section 22. The MPU section 10 further causes the image data processing section 22 to digitalize the analog data. The digitalized data is sequentially buffered in the RAM 12. The data buffered in the RAM 12 is read out and converted into a print format by the recording control section 31. In outputting to the recording paper the print data converted by the recording control section 31 and transferred to the cartridge, the motor control section 33 causes the PF motor 35 to feed the recording paper and causes the CR motor 34 to operate. In this operating state, the use temperature detecting section 17 detects the internal temperature of the facsimile apparatus 1.

The motor control section 33 requires electric power to drive, for example, three types of driving sources, i.e., motors, and as a result of consuming the electric power, it generates heat. The heat thus generated increases the internal temperature of the facsimile apparatus 1, and the internal temperature of the facsimile apparatus 1 is detected, that is, measured, by the use temperature detecting section 17. Note that the MPU section 10 and the motor control section 33 constitute the control means.

In order to maximize performance of continuous copying operation, that is, to attain the best copying rate, in the facsimile apparatus 1, it is necessary to perform the reading operation in the reading operating unit 20 and the recording operation in the recording operating unit 30 at the same time to thereby read out the document 2 while outputting the data to the recording paper. The continuous operation, however, requires the largest electric power and becomes the most major factor for a temperature rise inside the facsimile apparatus 1.

FIGS. 2A and 2B are flowcharts each showing a motor control process performed by the facsimile apparatus 1 shown in FIG. 1. The motor control process indicates a process performed for lowering the internal temperature of the facsimile apparatus 1 while maintaining the throughput of the facsimile apparatus 1 as high as possible. When a user selects, for example, copy operation by use of the panel control section 13, Step A1 starts.

In Step A1, the use temperature is monitored. Specifically, when the copy operation starts, the internal temperature of the facsimile apparatus 1 is detected, that is, measured, by the use temperature detecting section 17, and the measured result is then sent to the MPU section 10. In Step A2, the MPU section 10 determines whether or not the measured temperature is lower than a threshold value 1. The threshold value 1 is the first threshold temperature for securing the highest throughput, and for example, 40 degrees Celsius. If the measured temperature is lower than the threshold value 1, the process goes to Step A3, and if the measured temperature is not lower than the threshold value 1, the process goes to Step A4.

In Step A3, the MPU section 10 operates the motors, i.e., the scanner motor 23, the CR motor 34, and the PF motor 35, at the same time by use of the motor control section 33, and the process then ends. Specifically, the reading operation in the reading operating unit 20 and the recording operation in the recording operating unit 30 are performed at the same time so that the document 2 is read out while the data is sequentially outputted to the recording paper. That is to say, the scanner motor 23, the CR motor 34, and the PF motor 35 operate at the same time, which consumes electric power most, resulting in an increase in the internal temperature of the facsimile apparatus 1. As long as the condition of Step A2 is satisfied, it is possible to perform the copy operation while maintaining this operating state with high throughput.

In Step A4, the MPU section 10 determines whether or not the measured temperature is lower than a threshold value 2. The threshold value 2 is the second threshold temperature which is set with the aim of securing the second highest throughput while decreasing the power consumption and thereby lowering the temperature as compared to the case of the threshold value 1, and for example, 50 degrees Celsius. If the measured temperature is lower than the threshold value 2, the process goes to Step A5, and if the measured temperature is not lower than the threshold value 2, the process goes to Step A6. In Step A5, the MPU section 10 causes the motors, i.e., the CR motor 34 and the PF motor 35, to operate in the time-sharing mode, and the process then ends. Specifically, in operating the reading operation in the reading operating unit 20 and the recording operation in the recording operating unit 30 at the same time, the CR motor 34 and PF motor 35 for recording operation are operated in the time-sharing mode. That is to say, the scanner motor 23 and the CR motor 34, or alternatively, the scanner motor 23 and the PF motor 35, simultaneously operate in combination. In other words, the scanner motor 23 operates simultaneously with the CR motor 34 or the PF motor 35. As compared to the throughput in Step A3, the throughput will be lower, but the decrease of power consumption allows for inhibition of increase, or lowering, of the internal temperature of the facsimile apparatus 1.

In Step A6, the MPU section 10 determines whether or not the measured temperature is lower than a threshold value 3. The threshold value 3 is the third threshold temperature which is set with the aim of securing the third highest throughput while decreasing the power consumption and thereby lowering the temperature as compared to the case of the threshold value 2, and for example, 60 degrees Celsius. If the measured temperature is lower than the threshold value 3, the process goes to Step A7, and it the measured temperature is not lower than the threshold value 3, the process goes to Step A8. In Step A7, the MPU section 10 causes the motors, i.e., the scanner motor 23, the CR motor 34, and the PF motor 35, to operate in the time-sharing mode, and the process then ends. Specifically, the reading operation in the reading operating unit 20 and the recording operation in the recording operating unit 30 are carried out completely independently of each other in the time-sharing mode. That is to say, the scanner motor 23, the CP motor 34, and the PF motor 35 operate in different time zones. Consequently, as compared to the throughput in Step A5, the throughput will be lower, but the further decrease of power consumption allows for inhibition of increase, or lowering, of the internal temperature of the facsimile apparatus 1.

In Step A8, the MPU section 10 determines whether or not the measured temperature is lower than a threshold value 4. The threshold value 4 is the fourth threshold temperature which is set with the aim of securing the same throughput as the third highest throughput and decreasing the temperature even further, and for example, 70 degrees Celsius. If the measured temperature is lower than the threshold value 4, the process goes to Step A9, and if the measured temperature is not lower than the threshold value 4, the process goes to Step A10. In Step A9, the MPU section 10 performs power-down controls on the network control section 16 and the communication control section 15, as well as causes the motors, i.e., the scanner motor 23, the CR motor 34, and the PF motor 35, to operate in the time-sharing mode, and the process then ends. Specifically, a circuit block unnecessary for the copy operation, which is for example the network control section 16 and the communication control section 15, is powered down, that is, turned into a low-power-consumption mode. The low-power-consumption mode is a mode in which the circuit block stands by on electric power less than electric power consumed in operation. Consequently, while maintaining the throughput at the same level as that in Step A6, the further decrease of power consumption allows for further inhibition of increase, or lowering, of the internal temperature of the facsimile apparatus 1.

In Step A10, the MPU section 10 performs power-down controls on the network control section 16 and the communication control section 15, as well as causes the motors, i.e., the scanner motor 23, the CR motor 34, and the PF motor 35, to all stop, and the process then ends. In the case where the internal temperature of the facsimile apparatus 1 exceeds the threshold value 4, there is an urgent need of lowering the temperature and therefore, the copy operation is stopped to lower the internal temperature of the facsimile apparatus 1. After the completion of the process shown in FIGS. 2A and 2B, a pause lasting a predetermined length of time, for example, 10 seconds, is given before the process shown in FIGS. 2A and 2B is repeated from Step A1.

Figure 3:
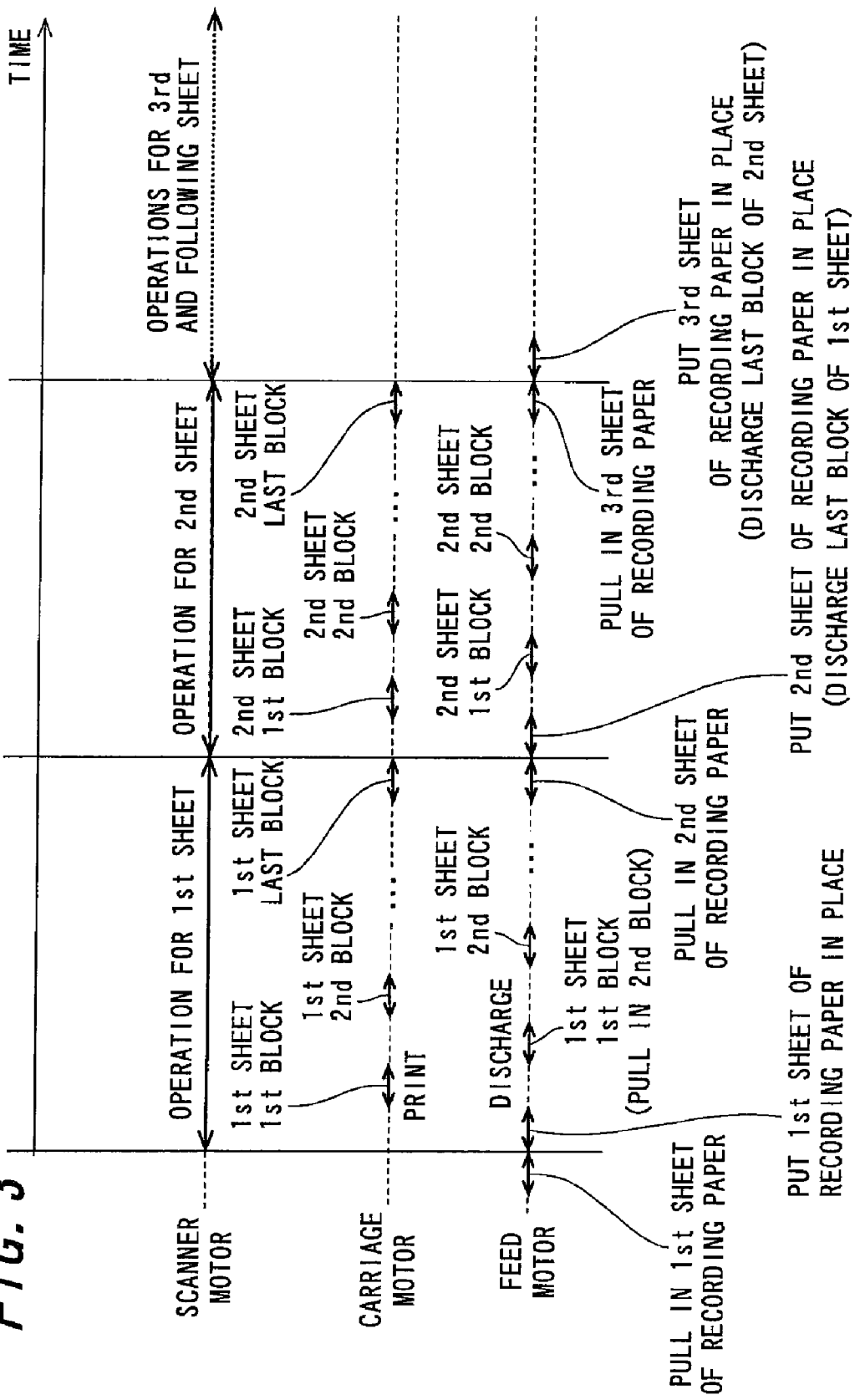
FIG. 3 is a time chart showing one example of simultaneous operation of plural motors performed by the facsimile apparatus 1 shown in FIG. 1.

FIG. 3 is a time chart showing one example of simultaneous operation of plural motors performed by the facsimile apparatus 1 shown in FIG. 1. FIG. 3 shows an example of the simultaneous operation in Step A3 in the flowchart shown in FIG. 2A. The feed motor, i.e., the PF motor 35, pulls in one sheet of the recording paper, and the scanner motor 23 then starts the operation on the first sheet. While the scanner motor 23 performs the operation on the first sheet, the carriage motor, i.e., the CR motor 34, and the feed motor operate alternately for respective blocks. One block is one carriage unit, that is, a unit for printing per one scanning. First of all, the feed motor puts the first sheet of the recording paper in place, and the carriage motor then prints the first block of the first sheet. After the completion of printing of the first block, the feed motor feeds paper so as to discharge the printed first block and pull in the second block. Next, the carriage motor prints the second block of the first sheet and after the completion of such printing, the feed motor feeds paper so as to discharge the printed second block and pull in the third block. For the third and following blocks, the same operation is carried out as the operation for the first block and the second block. The operation of the carriage motor for the last block of the first sheet and the pull-in operation of the feed motor for the second sheet of the recording paper are carried out at the same time. The feed motor discharges the last block of the first sheet in parallel with placement of the second sheet of the recording paper. Also for the second and following sheets of the recording paper, the same operation is carried out as the operation for the first sheet of the recording paper. In this case, the carriage motor and the feed motor cannot operate at the same time for one block and therefore operate alternately. Since the next sheet of the recording paper can be pulled in at the same time, those motors operate at the same time.

Figure 4:
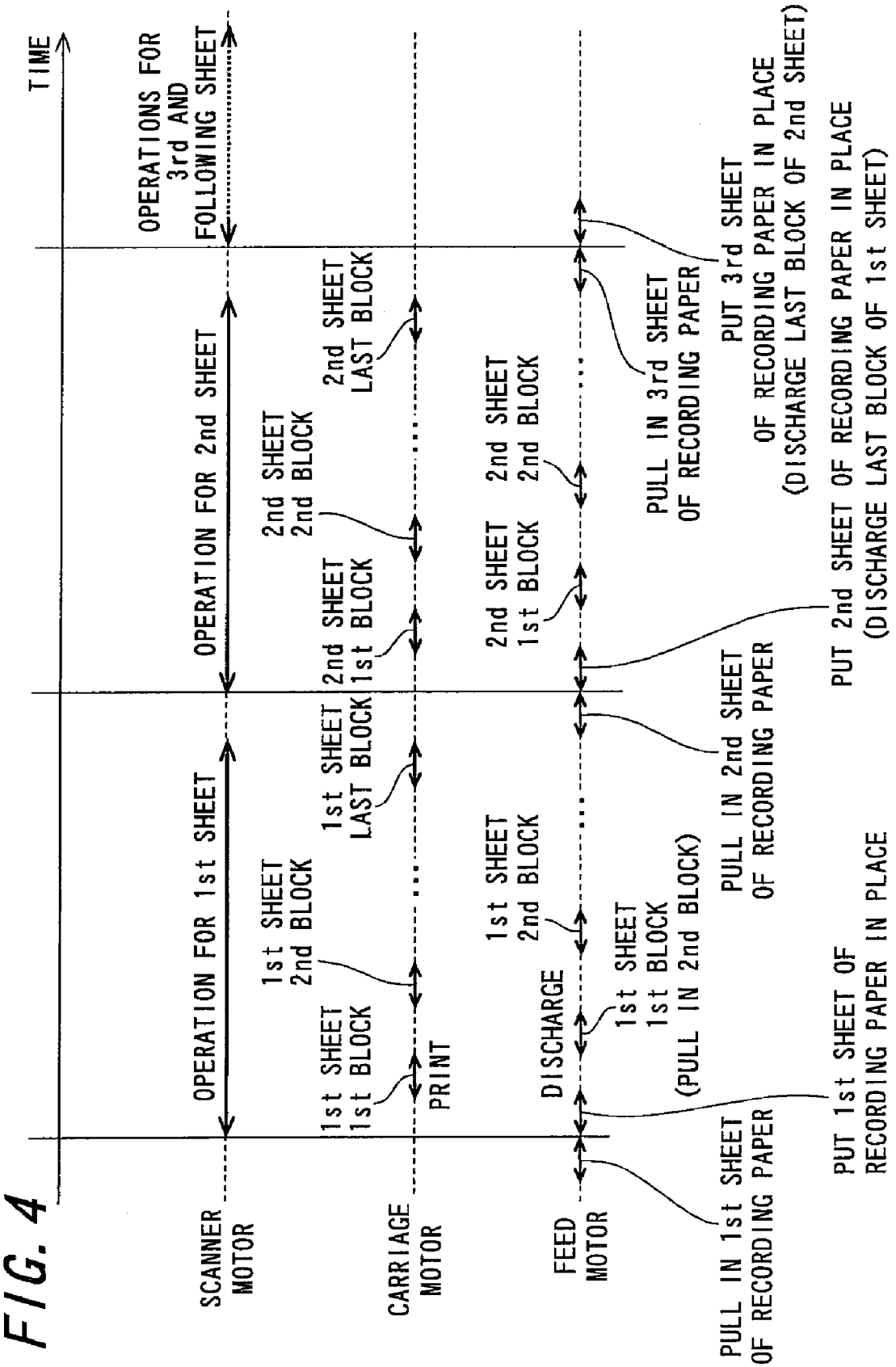
FIG. 4 is a time chart showing one example of time-sharing operation of plural motors performed by the facsimile apparatus 1 shown in FIG. 1.

FIG. 4 is a time chart showing one example of time-sharing operation of plural motors performed by the facsimile apparatus 1 shown in FIG. 1. In this example, the feed motor pulls in the second sheet of the recording paper after the operation of the carriage motor for the last block of the first sheet, and thus the operation of the carriage motor and the operation of the feed motor are carried out completely in the time-sharing mode. However, the scanner motor and the carriage motor, or alternatively, the scanner motor and the feed motor, simultaneously operate in combination.

Figure 5:
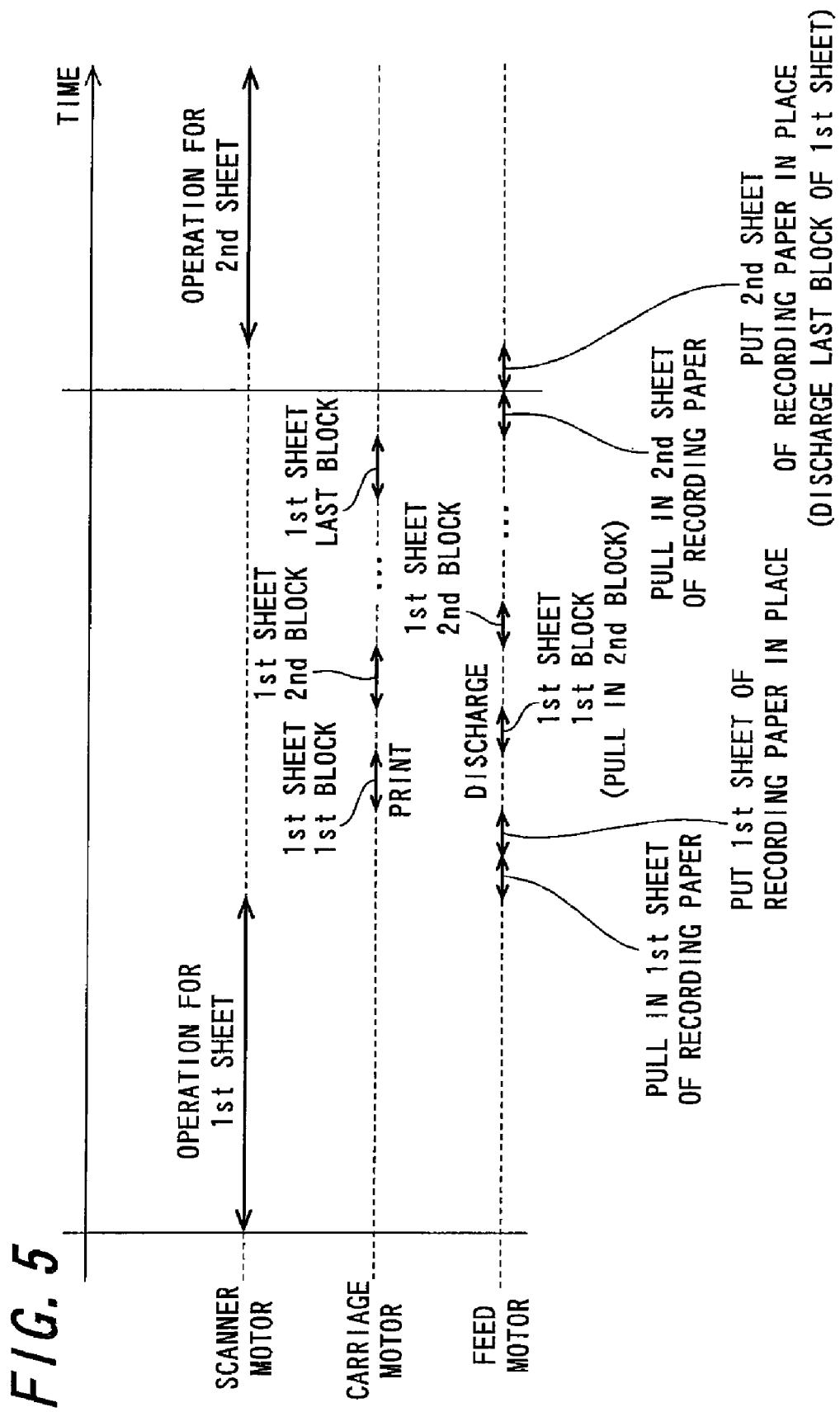
FIG. 5 is a time chart showing another example of the time-sharing operation of plural motors performed by the facsimile apparatus 1 shown in FIG. 1.

FIG. 5 is a time chart showing another example of the time-sharing operation of plural motors performed by the facsimile apparatus 1 shown in FIG. 1. After the operation of the scanner motor 23 for the first sheet, the feed motor pulls in the first sheet of the recording paper. After the first sheet of the recording paper is pulled in, the feed motor puts the first sheet of the recording paper in place and then, the carriage motor and the feed motor operate alternately for respective blocks. The operation of the scanner motor 23 for the second sheet of the recording paper is carried out after the completion of operation of the carriage motor and the feed motor for the first sheet of the recording paper. That is to say, only one motor operates at all times.

The above-described embodiment refers to the copy operation which is, however, not a limited option, and as long as a plurality of motors operate at the same time, the internal temperature of the facsimile apparatus 1 can be lowered by the same sort of time-sharing operation of the plurality of motors. Furthermore, a time-sharing unit is a combination of one page unit and one carriage unit, and may be one page unit, one carriage unit, or any other unit according to the purpose. For example, the time-shared length can be determined according to a motor to be driven.

As described above, the MPU section 10 and motor control section 33 functioning as control means control the plurality of driving sources, i.e., motors, and the use temperature detecting section 17 functioning as temperature detecting means detects the internal temperature of the apparatus incorporating the plurality of driving sources and the control means. Furthermore, when the temperature detected by the temperature detecting means is lower than the predetermined temperature, the control means operates all the plurality of driving sources at the same time, and when the temperature detected by the temperature detecting means is equal to or higher than the predetermined temperature, the control means divides the plurality of driving sources into the first group composed of the driving sources to be operated and the second group composed of the driving sources to be stopped, and for every time point that the predetermined length of time has passed, the control means stops the operation of at least one driving source out of the driving sources included in the first group and adding the driving source to the second group while operating at least one driving source out of the driving sources included in the second group and adding the driving source to the first group. Accordingly, a part of the diving sources, i.e., motors, are stopped and the stopped motors are sequentially switched when the temperature detected by the temperature detecting means is equal to or higher than the predetermined temperature, with the result that heat generation from the plurality of motors and a control circuit for controlling the motors can be suppressed without stopping operation of the motors entirely. Consequently, the motors and the electronic components such as LSI which controls the motors can be prevented from being broken, so that the reliability of the electronic apparatuses can be enhanced.

Furthermore, the number of driving sources, i.e., motors, to be stopped is increased for every time that a higher predetermined temperature is detected out of the plurality of predetermined temperatures, therefore allowing for a further decrease in the calorific value. Consequently, the temperature can be quickly lowered.

Furthermore, the MPU section 10 and motor control section 33 functioning as the control means switch to the lower-power-consumption mode the network control section 16 and communication control section 15 functioning as additional circuits irrelevant to the operation to be done by the apparatus at that moment, when, in the state of having one driving source in the first group, a temperature higher than the highest predetermined temperature out of the plurality of predetermined temperatures is detected by the use temperature detecting section 17 functioning as the temperature detecting means, therefore leading to a decrease in a calorific value of the additional circuit, which thus allows the apparatus to have a lower temperature. Consequently, the apparatus can operate without stopping the operation of the electronic apparatus entirely.

Moreover, the motor control section 33 is one LSI controlling the plurality of driving sources, i.e., motors, with the result that the larger the number of the motors to be stopped is, the lower the temperature of the LSI can be. It is therefore possible to curb a rise of internal temperature of electronic apparatus with heat generated by the LSI.

Furthermore, the plurality of driving sources, i.e., motors, include the carriage motor moving an ink head, the feed motor supplying and feeding the recording paper for print use, and the scanner motor driving a scanner, which motors are therefore applicable to a multifunctional machine having a plurality of functions such as a facsimile function. It is therefore possible to curb a rise of internal temperature of an apparatus represented by the multifunctional machine.

Moreover, the predetermined length of time is a length of time for handling one sheet of the recording paper, or a length of time for handing one carriage, or combination of the length of time for handling one sheet of the recording paper and the length of time for handling one carriage, with the result that the length of operation time can be set according to a role of the motor to be operated. It is therefore possible to efficiently operate an apparatus while its temperature rise is curbed.

The invention may be embodied in other various forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. An electronic apparatus, comprising:
a plurality of driving sources;
control means for controlling the plurality of driving sources; and
temperature detecting means for detecting an internal temperature of the apparatus incorporating the plurality of driving sources and the control means,
wherein, when the temperature detected by the temperature detecting means is lower than a lowest temperature among a plurality of predetermined temperatures, the control means operates all of the plurality of driving sources simultaneously, and when the temperature detected by the temperature detecting means is equal to or higher than the lowest temperature among the plurality of predetermined temperatures, the control means divides the plurality of driving sources into a first group composed of the driving sources to be operated and a second group composed of the driving sources to be stopped, and for every time point that a predetermined length of time has passed, the control means stops operation of at least one first driving source among the driving sources included in the first group and adds the at least one first driving source to the second group while operating at least one second driving source among the driving sources included in the second group and adding the at least one second driving source to the first group,
wherein the control means increases the number of driving sources included in the second group when a temperature higher than the highest predetermined temperature among the plurality of predetermined temperatures is detected by the temperature detecting means,
wherein the electronic apparatus further comprises an additional circuit operating independently of operation of the plurality of driving sources and having a low-power-consumption mode that the additional circuit stands by on electric power less than electric power consumed in operation, wherein, the control means switches to the low-power-consumption mode the additional circuit irrelevant to operation to be done by the apparatus at that moment, when a temperature among the plurality of predetermined temperatures is detected by the temperature detecting means in a state of having one driving source in the first group.

2. The electronic apparatus of claim 1, wherein the control means includes one LSI controlling the plurality of driving sources.

3. An electronic apparatus, comprising:
a plurality of driving sources;
control means for controlling the plurality of driving sources; and
temperature detecting means for detecting an internal temperature of the apparatus incorporating the plurality of driving sources and the control means, wherein, when the temperature detected by the temperature detecting means is lower than a lowest temperature among a plurality of predetermined temperatures, the control means operates all the plurality of driving sources simultaneously, and when the temperature detected by the temperature detecting means is equal to or higher than the lowest temperature among the plurality of predetermined temperatures, the control means divides the plurality of driving sources into a first group composed of the driving sources to be operated and a second group composed of the driving sources to be stopped, and for every time point that a predetermined length of time has passed, the control means stops operation of at least one first driving source among the driving sources included in the first group and adds the driving source to the second group while operating at least one second driving source among the driving sources included in the second group and adding the driving source to the first group,
wherein the plurality of driving sources includes a carriage moving an ink head, a feed motor supplying and feeding recording paper for print use, and a scanner motor driving a scanner.

4. The electronic apparatus of claim 3, wherein the control means includes one LSI controlling the plurality of driving sources.

5. The electronic apparatus of claim 4, wherein the predetermined length of time is a length of time for handling one sheet of the recording paper, or a length of time for handing one carriage, or combination of the length of time for handling one sheet of the recording paper and the length of time for handling one carriage.

* * * * *